(12) United States Patent
Stojkovic et al.

(10) Patent No.: US 7,871,123 B2
(45) Date of Patent: Jan. 18, 2011

(54) A-PILLAR JOINT FOR AUTOMOTIVE VEHICLES

(75) Inventors: Dragan Stojkovic, Southgate, MI (US); Larry J. Dupuis, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 12/141,909

(22) Filed: Jun. 18, 2008

(65) Prior Publication Data

US 2009/0315364 A1    Dec. 24, 2009

(51) Int. Cl.
*B62D 25/08* (2006.01)

(52) U.S. Cl. .............................. 296/193.09; 296/203.02; 296/205

(58) Field of Classification Search .................. 296/29, 296/30, 187.01, 187.03, 187.09, 187.1, 187.12, 296/193.5, 193.06, 193.09, 203.01, 203.02, 296/203.03, 205; 180/89.1; 280/781
See application file for complete search history.

(56) References Cited

U.S. PATENT DOCUMENTS

| | | | | |
|---|---|---|---|---|
| 5,720,511 A | * | 2/1998 | Benedyk | 296/203.01 |
| 6,092,865 A | * | 7/2000 | Jaekel et al. | 296/205 |
| 6,282,790 B1 | * | 9/2001 | Jaekel et al. | 29/897.2 |
| 6,533,348 B1 | * | 3/2003 | Jaekel et al. | 296/205 |
| 6,869,136 B2 | * | 3/2005 | Igarashi et al. | 296/204 |
| 6,926,350 B2 | * | 8/2005 | Gabbianelli et al. | 296/203.01 |
| 7,036,874 B2 | | 5/2006 | Stojkovic | 296/193.09 |
| 7,066,533 B2 | * | 6/2006 | Sohmshetty et al. | 296/203.02 |
| 7,090,273 B2 | | 8/2006 | Stojkovic | 296/29 |
| 7,210,733 B2 | | 5/2007 | Mouch | 296/203.02 |
| 7,222,912 B2 | * | 5/2007 | Deme et al. | 296/203.02 |
| 7,267,394 B1 | * | 9/2007 | Mouch et al. | 296/203.02 |
| 7,347,491 B2 | * | 3/2008 | Mouch et al. | 296/209 |
| 7,441,830 B2 | * | 10/2008 | Caliskan et al. | 296/204 |
| 2005/0196228 A1 | * | 9/2005 | Bruggemann et al. | 403/231 |

* cited by examiner

*Primary Examiner*—Glenn Dayoan
*Assistant Examiner*—Pinel E Romain
(74) *Attorney, Agent, or Firm*—Frederick Owens, Esq.; Miller Law Group, PLLC

(57) ABSTRACT

An A-pillar joint configuration where the front end frame rail members are welded to the A-pillar eliminates the seals at the interface between the front end frame rail members and the A-pillars. The front flange of the A-pillar is also eliminated in the hydroformed configuration while the hydroformed frame rail members are formed with rearward ends that mate with the shape of A-pillar to positioned flattened ends against the exterior vertical side of the A-pillars for welding thereto. The resulting joint configuration eliminates the openings in the A-pillar for the passage of the front end frame rail members requiring seals to insulate the passenger compartment from engine and road noises.

19 Claims, 4 Drawing Sheets

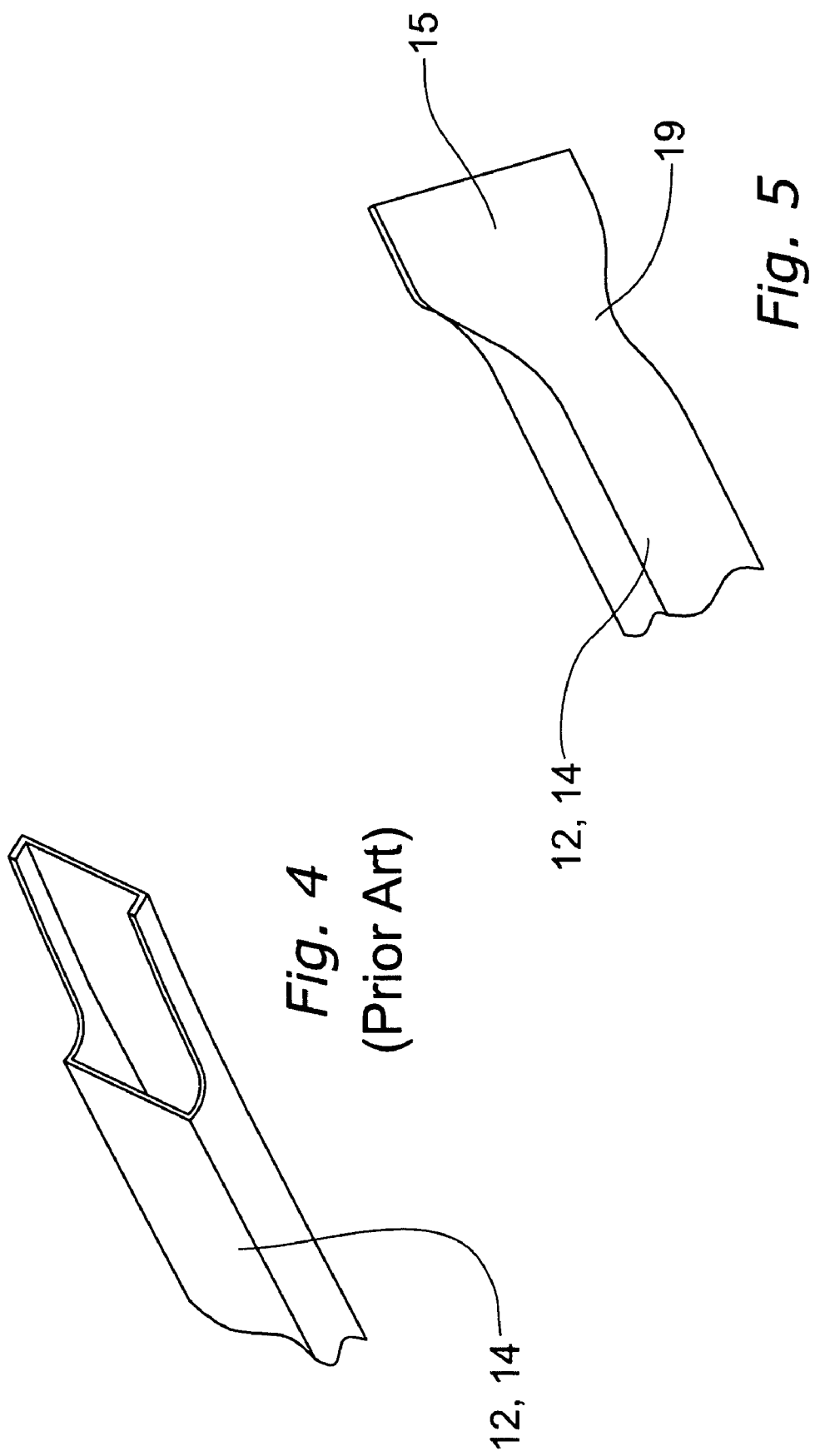

A-PILLAR JOINT FOR AUTOMOTIVE VEHICLES

FIELD OF THE INVENTION

This invention relates to the frame of an automotive vehicle and, more particularly, to a joint at the A-pillar with the upper and lower side rails of an automotive front end.

BACKGROUND OF THE INVENTION

An automotive body construction includes a front end frame structure that is coupled to the main frame components of the automotive body. More specifically, the body construction is formed with generally vertical main frame components referred to as the A-pillars to which the front doors of the vehicle are hingedly supported. The front end structure includes upper and lower frame rails, the upper rail and a corresponding shock tower support rail being commonly referred to as the shotgun, which are typically welded to the laterally spaced A-pillars and extend forwardly therefrom along the sides of the front end to support the engine and suspension components and to support the front bumper. This front end structure is shown in U.S. Pat. No. 7,210,733, granted to Tim Mouch, et al on May 1, 2007, in which these front end rail members pass through openings into the A-pillar for connection thereto.

The A-pillar is conventionally formed with a front flange to provide strength thereto, as is depicted in U.S. Pat. No. 7,036,874, issued on May 2, 2006, to Dragan Stojkovic, et al, and in U.S. Pat. No. 7,090,273, granted to Dragan Stojkovic, et al on Aug. 15, 2006. As can be seen in these two patents, the upper and lower rails project through openings or slots formed in the front flange of the A-pillar to allow passage of the rearward ends of the upper and lower rails to be welded to the main vertically extending portion of the A-pillar. As is specifically disclosed in U.S. Pat. No. 7,090,273, the rearward ends of the upper and lower front end rails are associated with seal devices to seal the interface between the upper and lower rails and the respective A-pillars. These seals are utilized to insulate the interior vehicle cab, i.e. the passenger compartment, from the engine compartment to reduce the transmission of noise typically produced by the engine, the road and various other external noise sources.

The use of the tubular seals at the interface of the upper and lower front end rails and the respective laterally spaced A-pillars, is an expensive component for incorporation into the automotive body because of the number of components that are provided and the additional time required to affect assembly thereof. Accordingly, it would be desirable to provide a joint configuration between the upper and lower front end rails and the A-pillar that would not require the use of inside tubular seals or outer seals at the interface between the respective components.

SUMMARY OF THE INVENTION

It is an object of this invention to overcome the aforementioned disadvantages of the known prior art by providing a joint configuration between the front end frame rails and the A-pillar without requiring openings to be formed in the A-pillar to permit the front end frame rails to be welded to the A-pillar.

It is another object of this invention to eliminate the requirement of seals at the interface of the front end frame rails with the A-pillar structure.

It is a feature of this invention that the front end frame rail members can be welded to the A-pillar without requiring openings in the A-pillar.

It is an advantage of this invention that neither the inside tube seals nor the outer seals are required at the interface between the front end frame rails and the A-pillar structure.

It is another feature of this invention that the ends of the front end frame rail members can be formed during a hydroforming process to create a flattened end that can be welded directly to the A-pillar structure to form a joint therewith.

It is still another feature of this invention that the A-pillar is hydroformed from a tubular member.

It is yet another feature of this invention that the rearward ends of the front end frame rail members are formed to mate with the A-pillar to facilitate the welding of the rail members to the A-pillar.

It is still another advantage of this invention that the manufacturing costs of the front end to A-pillar joint are reduced.

It is yet another object of this invention to provide a joint configuration between the front end frame rail members and the A-pillars of an automotive vehicle that is durable in construction, inexpensive of manufacture, carefree of maintenance, facile in assemblage, and simple and effective in use.

These and other objects, features and advantages are accomplished according to the instant invention by providing an A-pillar joint configuration where the front end frame rail members are welded to the A-pillar that eliminates the seals at the interface between the front end frame rail members and the A-pillars. The front flange of the A-pillar is eliminated in the hydroformed configuration while the hydroformed frame rail members are formed with rearward ends that mate with the shape of A-pillar to positioned flattened ends against the sides of the A-pillar for welding thereto. The resulting joint configuration eliminates the openings in the A-pillar for the passage of the front end frame rail members requiring seals to insulate the passenger compartment from engine and road noises.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is an enlarged detail view of the prior art rearward end portion of the front end frame rail members having the end portion laser cut after being hydroformed to permit the installation of seals at the interface with the A-pillar; and FIG. 5 is an enlarged detail view of the rearward end portion of the front end frame rail members formed through the hydroforming process to mate with the hydroformed A-pillar.

DETAILED DESCRIPTION OF THE PREFERRED EMBODIMENT

Figure 1:
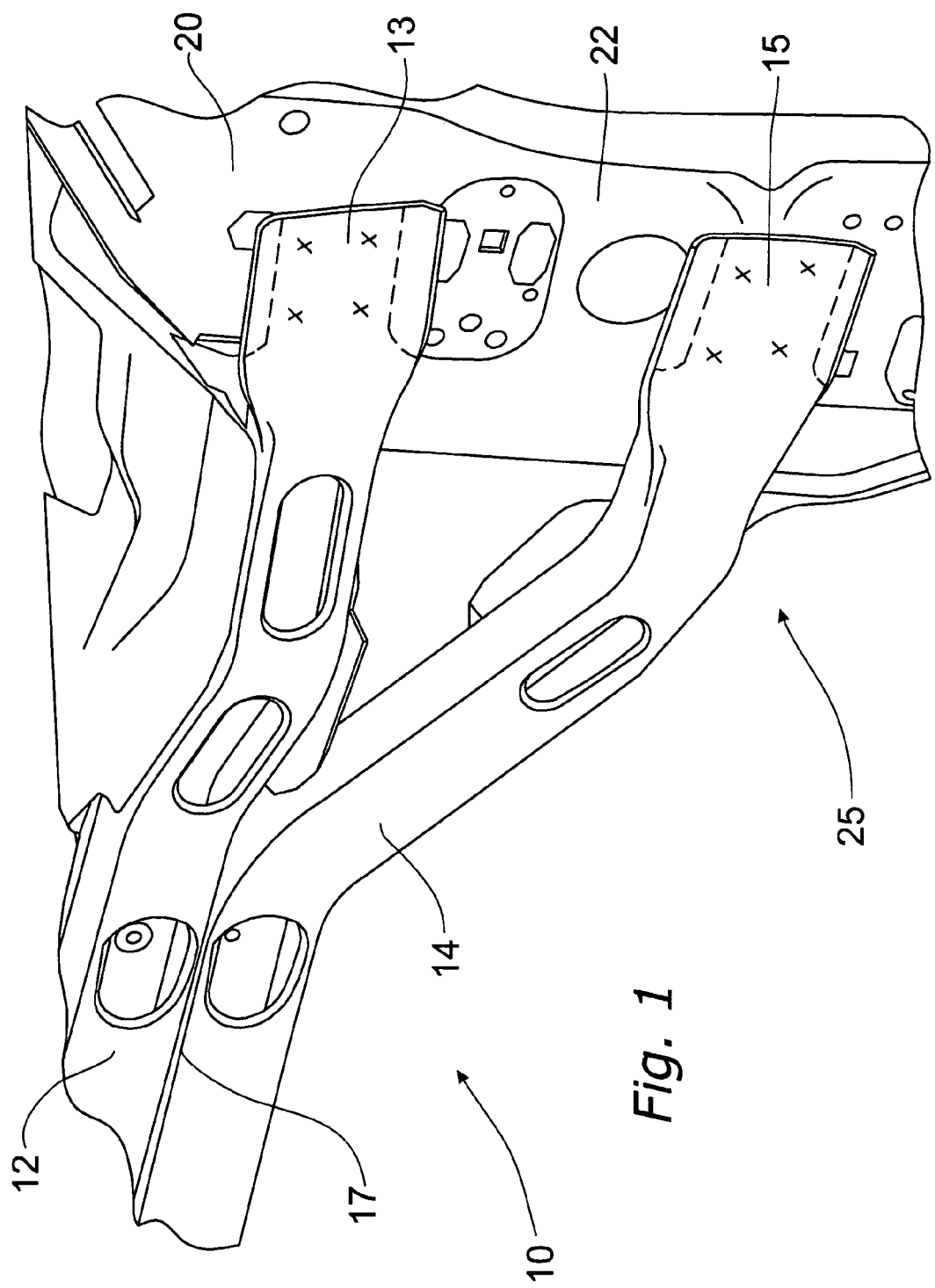
FIG. 1 is a partial exterior side perspective view of an A-pillar joint configuration incorporating the principles of the instant invention, the A-pillar and the front end frame rail members being broken away for purposes of clarity.

Referring to the drawings, a joint configuration between the A-pillar and the front end frame rail members incorporating the principles of the instant invention can best be seen. The front end 10 of the automotive vehicle is described in greater detail in U.S. Pat. No. 7,210,733, granted to Tim Mouch, et al on May 1, 2007, the contents of which are incorporated herein by reference. The upper front end frame rail member 12 extends along the upper portion of the front end 10 of the vehicle and has a downwardly extending portion that joins to the lower front end frame rail member (not shown) to support the front bumper of the vehicle in a known manner. The front end 10 is also provided with a shock tower support rail 14 that joins to the upper front end frame rail 12 at a location 17 spaced forwardly of the A-pillar 20.

The A-pillar is formed through a hydroforming process into a tubular configuration having a pair of laterally spaced, longitudinally extending vertical faces joined at the front and rear edges by longitudinally spaced, front and rear walls to define a generally tubular member 20. The longitudinally extending vertical faces include an exterior vertical face and an interior vertical face. An A-pillar 20 formed in this manner has sufficient strength to support the front end structure 10 of the vehicle without requiring a transversely extending front flange through which holes or slots are formed to permit the passage of the front end frame rail members in a conventional joint configuration.

The shock tower support rail 14 has a rearward portion 15 that is affixed to the A-pillar 20, preferably by welding. Similarly, the upper front end frame rail member 12 has a rearwardly extending portion 13 that extends rearwardly of the connection with the shock tower support rail 14 to be affixed to the A-pillar 20, preferably by welding. The rearward end 13 of the upper front end frame rail member 12 and the rearward end 15 of the shock tower support rail member 14 diverge rearwardly from their interconnection so that the two rearward ends 13, 15 are vertically spaced to provide stability and strength to the joint configuration thereof with the A-pillar 20.

Each of these front end frame rail members 12, 14 are also formed through a hydroforming process in which a standard tubular stock member is placed into a form shaped to correspond to the particular member to be formed and to correspond to the particular section required for the frame design. A liquid is then introduced into the interior of the tubular stock and pressurized until the tubular stock expands to assume the shape defined by the configured form. The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members, particularly for components like frame rail members. The form or die within which the member is hydroformed can also be configured to pinch or flatten a portion of the tubular member when the opposing sides of the form come together.

The conventional formation of the rearward end of the front end frame rail member 12, 14 is depicted in FIG. 4 in which the tubular frame rail 12, 14 is formed through the hydroforming process and the end portion is laser cut to facilitate the attachment of the seals to the front end frame rail member 12, 14, as is known in the art. As can be seen best in FIG. 5, the rearward end of each of the front end frame rail members 12, 14 constructed according to the principles of the instant invention is pinched in the forming die to create a flattened area that can be placed against the A-pillar 20 to permit the flattened rearward end 13, 15 to be welded to the A-pillar 20. The A-pillar 20 is also formed through the hydroforming process to create a tubular member that has a large longitudinally extending vertical surface 22 against which the flattened ends 13, 15 can be welded.

Figure 2:
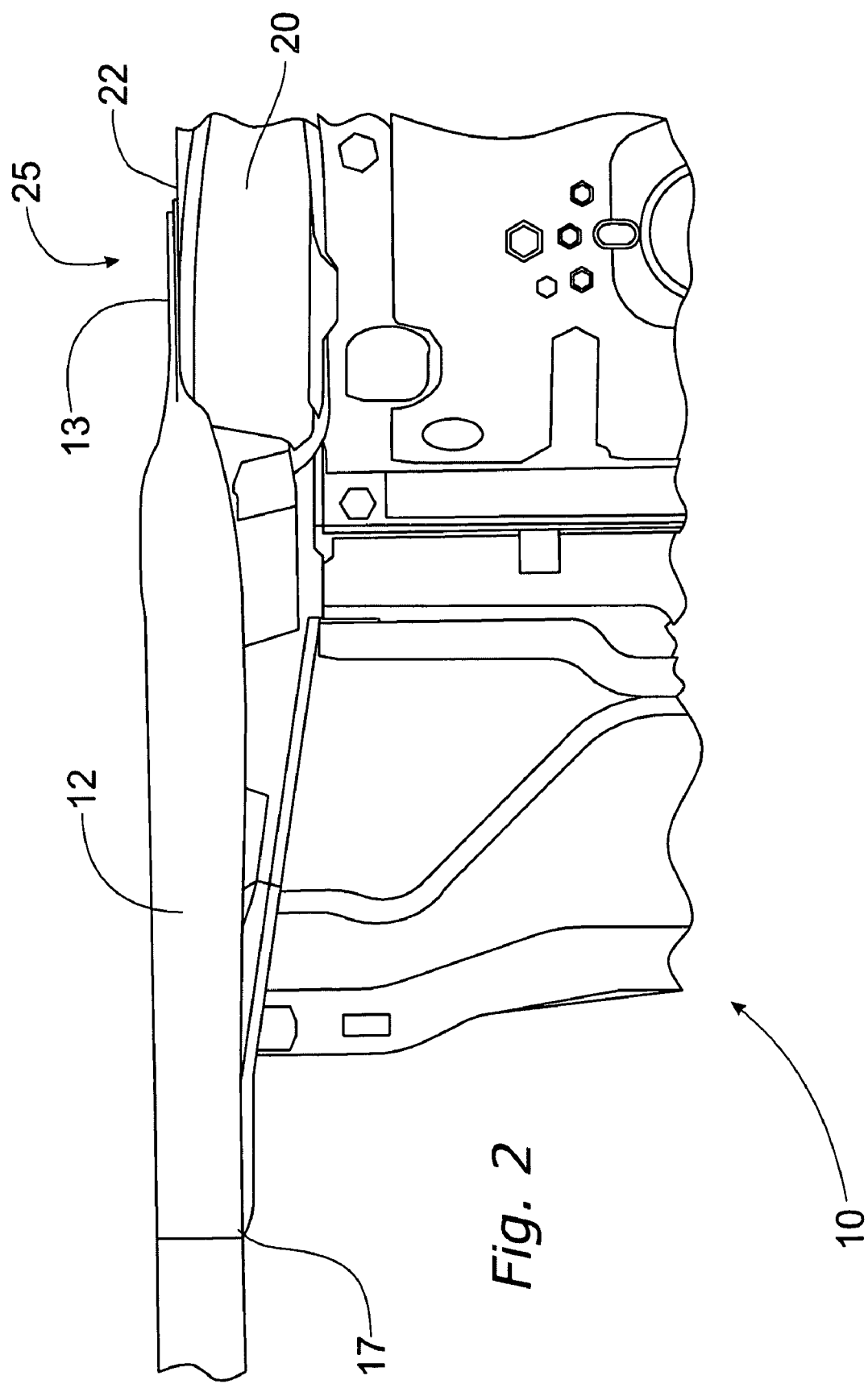
FIG. 2 is a partial top plan view of the A-pillar joint configuration depicted in FIG. 1.
Figure 3:
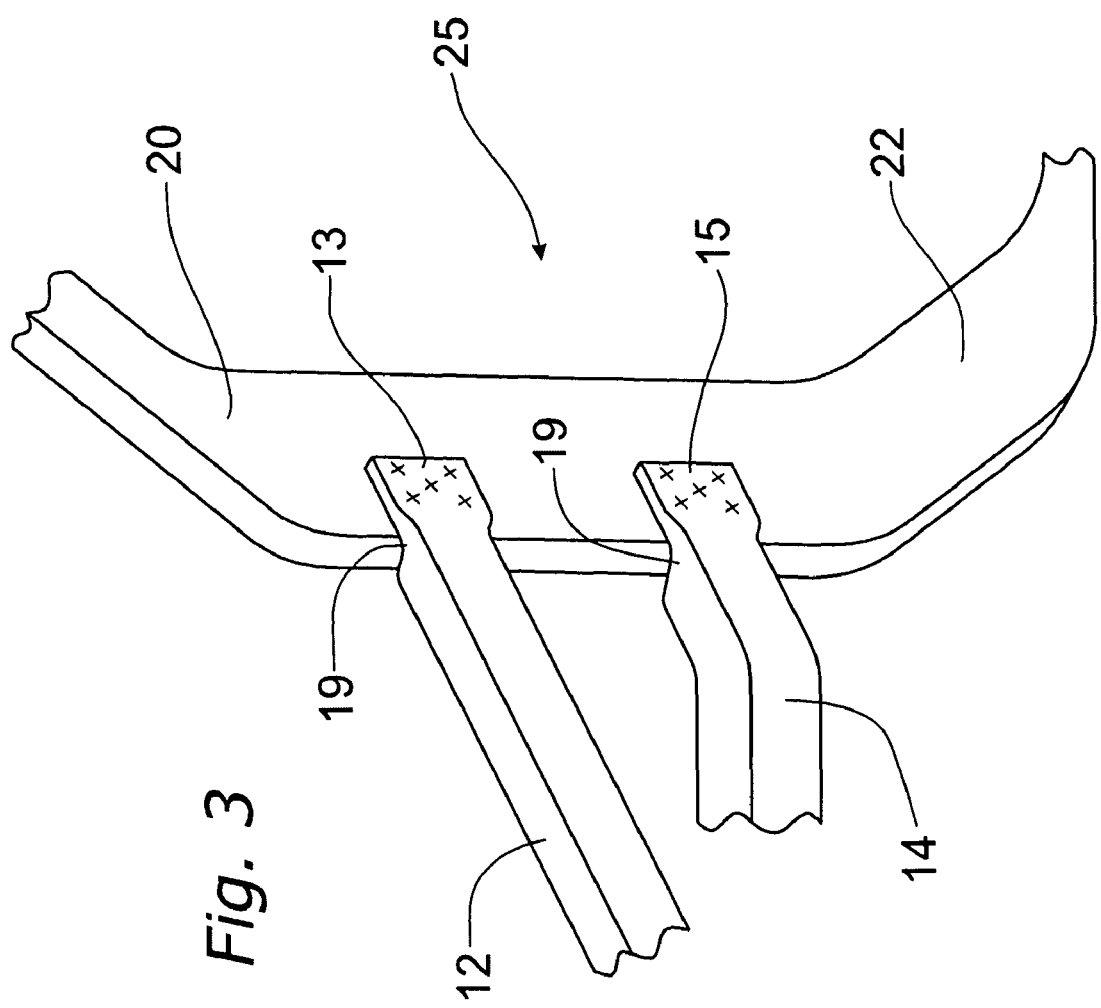
FIG. 3 is a schematic outer perspective view of the A-pillar joint configuration incorporating the principles of the instant invention.

By forming the A-pillar 20 as a tubular member, the A-pillar 20 is not formed with a conventional front flange through which an opening or slot must be formed to enable the front end frame rail members 12, 14 to access the longitudinally extending vertical surface of the A-pillar for attachment thereto. Furthermore, each of the front end frame rail members 12, 14 are formed with a sloped region 19 adjacent the flattened ends 13, 15 to permit the frame rail members 12, 14 to mate against the front wall of the tubular A-pillar 20. Therefore, as is best seen in FIGS. 2 and 3, the front end frame rail members 12, 14 can be oriented in substantial alignment with the tubular A-pillar 20 while the flattened rearward ends 13, 15 thereof are welded to the A-pillar 20.

Since the resulting joint configuration 25 does not require openings to be formed in the A-pillar 20 to allow the front end frame rail members 12, 14 to access the A-pillar 20 for welding thereto, the joint configuration 25 does not require seals at the interface of the front end frame rail members 12, 14 and the A-pillar 20 to isolate the frame rail members 12, 14 from the openings formed in the A-pillar front flange. Accordingly, the joint configuration 25 is formed with fewer parts and requires less assembly time to manufacture.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an automotive vehicle body having a pair of transversely spaced front pillars supporting a front end frame structure projecting forwardly of the front pillars, the front end frame structure including at least one generally longitudinally extending front end frame rail member corresponding to each respective front pillar, the improvement comprising:

each of the A-pillars being formed as a tubular member having a pair of longitudinally oriented vertical faces on opposing sides of the A-pillar, each front end frame rail member terminating in a rearwardly directed flattened end that is welded to the corresponding vertical face positioned on an exterior side of the respective A-pillar.

2. The automotive vehicle body of claim 1 wherein each front end frame rail member is formed with generally vertically oriented walls incorporating a sloped portion adjacent the flattened end to mate with an end face of the corresponding the A-pillar.

3. The automotive vehicle body of claim 2 wherein each front end frame rail member is formed as a tubular member having the flattened end formed on one side of the tubular member, the sloped portion providing a transition from the tubular configuration to the flattened end.

4. The automotive vehicle body of claim 3 wherein the front end frame structure includes at least two front end frame rail members, each front end frame rail member being formed in a tubular configuration with a sloped portion providing a transition to a flattened end offset to one side of the tubular configuration.

5. The automotive vehicle body of claim 4 wherein each A-pillar is devoid of an opening for the passage of one of the front end frame rail members into the A-pillar for connection therebetween.

6. The automotive vehicle body of claim 5 wherein the tubular configuration of each front end frame rail member adjacent the corresponding sloped portion thereof is in general alignment with the corresponding A-pillar.

7. An A-pillar joint configuration for an automotive vehicle comprising:
a tubular A-pillar having a pair of transversely spaced, longitudinally extending vertical faces, including an exterior vertical face and an interior vertical face, and a pair of longitudinally spaced transversely extending faces integrally formed with the vertical faces and including a forward face and a rearward face; and
a front end structure attached to the A-pillar, including at least one generally longitudinally extending tubular front end frame rail member having a tubular portion formed with generally longitudinally extending vertical walls, a flattened end and a sloped portion formed in the vertical walls of the tubular portion and defining a transition between the tubular portion and the flattened end, the sloped portion terminating at the corresponding flattened end, the flattened end being welded directly to one of the vertical faces without passing through the A pillar, the sloping portion orienting the flattened end for engagement with the corresponding vertical face.

8. The A-pillar joint configuration of claim 7 wherein the front end structure includes a second front end frame rail member formed with a second flattened end and an adjacent second sloping portion, the at least one front end frame rail member being a first front end frame rail member having a first flattened end and a first sloped portion adjacent thereto.

9. The A-pillar joint configuration of claim 8 wherein the first and second front end frame rail members are attached to the corresponding vertical face in a vertically spaced relationship.

10. The A-pillar joint configuration of claim 9 wherein the first and second sloped portions are formed to mate against the forward face of the A-pillar to locate the corresponding flattened end to one side of the front end frame rail member for engagement against the corresponding vertical face.

11. The A-pillar joint configuration of claim 10 wherein the first and second flattened ends are attached to the exterior vertical face of the A-pillar.

12. The A-pillar joint configuration of claim 11 wherein the first and second front end frame rail members are joined together at a position forward of the A-pillar, the first and second front end frame rail members diverging vertically rearwardly to attach to the exterior vertical face of the A-pillar in the vertically spaced relationship.

13. The A-pillar joint configuration of claim 12 wherein the front end frame rail members are formed through a hydroforming process with the flattened ends being formed as part of the hydroforming process.

14. The A-pillar joint configuration of claim 12 wherein the A-pillar is devoid of an opening for the passage of one of the front end frame rail members into the A-pillar for connection therebetween.

15. An automotive vehicle body comprising:
a pair of transversely spaced tubular A-pillars, each A-pillar having a pair of transversely spaced, longitudinally extending vertical faces, including an exterior vertical face and an interior vertical face, and a pair of longitudinally spaced transversely extending faces integrally formed with the vertical faces and including a forward face and a rearward face; and
a front end structure attached to the A-pillars, including at least one pair of transversely spaced, generally longitudinally extending tubular front end frame rail members connected respectively to the A-pillars, each front end frame rail member having a tubular portion formed with vertical walls, a flattened end at the terminus of the front end frame rail member and a sloped portion in the vertical walls forming a transition between the tubular portion and the flattened end, the flattened end being welded directly to one of the vertical faces without passing through the A-frame, the sloping portion orienting the flattened end for engagement with the corresponding vertical face of the A-pillar.

16. The automotive vehicle body of claim 15 wherein each A-pillar is devoid of an opening for the passage of one of the front end frame rail members into the A-pillar for connection therebetween.

17. The automotive vehicle body of claim 16 wherein the front end structure includes a second pair of front end frame rail members connected to the respective A-pillars, each second front end frame rail member being formed with a second flattened end and an adjacent second sloping portion, the at least one front end frame rail member being a first front end frame rail member having a first flattened end and a first sloped portion adjacent thereto, the first and second front end frame rail members being attached to the exterior vertical face of the corresponding A-pillar in a vertically spaced relationship.

18. The automotive vehicle body of claim 17 wherein the corresponding first and second front end frame rail members are joined together at a position forward of the A-pillar, the corresponding first and second front end frame rail members diverging vertically rearwardly to attach to the exterior vertical face of the A-pillar in the vertically spaced relationship.

19. The automotive vehicle body of claim 18 wherein the tubular configuration of each front end frame rail member adjacent the corresponding sloped portion thereof is in general alignment with the forward face of the corresponding A-pillar.

* * * * *